United States Patent
Kowarz

(10) Patent No.: US 7,411,722 B2
(45) Date of Patent: Aug. 12, 2008

(54) DISPLAY SYSTEM INCORPORATING BILINEAR ELECTROMECHANICAL GRATING DEVICE

(75) Inventor: Marek W. Kowarz, Henrietta, NY (US)

(73) Assignee: Eastman Kodak Company, Rochester, NY (US)

( * ) Notice: Subject to any disclaimer, the term of this patent is extended or adjusted under 35 U.S.C. 154(b) by 182 days.

(21) Appl. No.: 11/508,403

(22) Filed: Aug. 23, 2006

(65) Prior Publication Data

US 2007/0047061 A1 Mar. 1, 2007

Related U.S. Application Data

(60) Provisional application No. 60/711,008, filed on Aug. 24, 2005.

(51) Int. Cl.
G02B 26/08 (2006.01)
G03B 21/00 (2006.01)

(52) U.S. Cl. .................. 359/298; 359/291; 359/224; 359/618; 353/31; 353/34

(58) Field of Classification Search ............. 359/290, 359/291, 298, 451, 464, 466, 462, 259, 627, 359/618, 224, 242, 245, 231, 572; 353/7, 353/30, 31, 34, 38, 122; 348/774, E9.026, 348/E9.027; 347/239, 255; 345/30, 108; 365/145; 362/268; 372/102; 235/454; 250/234
See application file for complete search history.

(56) References Cited

U.S. PATENT DOCUMENTS

| | | | |
|---|---|---|---|
| 5,311,360 A | 5/1994 | Bloom et al. | 359/572 |
| 5,982,553 A | 11/1999 | Bloom et al. | 359/627 |
| 6,307,663 B1 | 10/2001 | Kowarz | 359/231 |
| 6,411,425 B1 | 6/2002 | Kowarz et al. | 359/291 |
| 6,476,848 B2 | 11/2002 | Kowarz et al. | 347/255 |
| 6,552,855 B1 * | 4/2003 | Kowarz et al. | 359/627 |
| 6,567,217 B1 * | 5/2003 | Kowarz et al. | 359/618 |
| 6,611,380 B2 * | 8/2003 | Kowarz et al. | 359/618 |
| 6,678,085 B2 | 1/2004 | Kowarz et al. | 359/291 |
| 6,734,889 B2 * | 5/2004 | Ramanujan et al. | 347/239 |
| 6,802,613 B2 * | 10/2004 | Agostinelli et al. | 353/31 |
| 6,829,089 B2 * | 12/2004 | Agostinelli et al. | 359/466 |
| 7,046,446 B1 * | 5/2006 | Kowarz et al. | 359/618 |
| 7,274,500 B2 * | 9/2007 | Kowarz | 359/242 |

* cited by examiner

Primary Examiner—Loha Ben
(74) Attorney, Agent, or Firm—Stephen H. Shaw

(57) ABSTRACT

A line scanned display system includes at least three different colors of illumination provided by one or more light sources, and at least one directional illumination optical system for directing the three different colors of illumination. Also in the system is a bilinear array, having two linear arrays of light modulating devices, situated on a common substrate for receiving and modulating two different colors of illumination at any one time that are obtained from the three different colors of illumination. Finally, a lens for creating line images of the two linear arrays on a screen and a scanning mirror for scanning the line images across the screen to form an area image complete the system.

20 Claims, 15 Drawing Sheets

Three-laser RGB Configuration

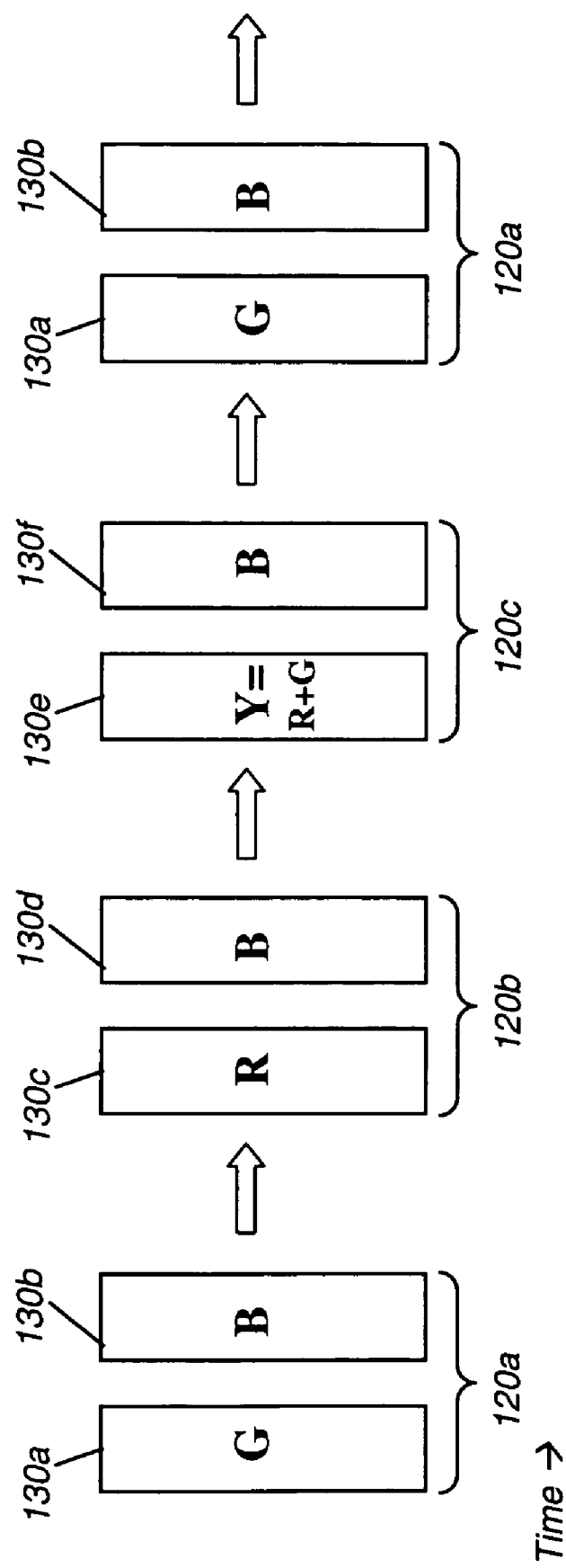

Four-laser RGBY Configuration

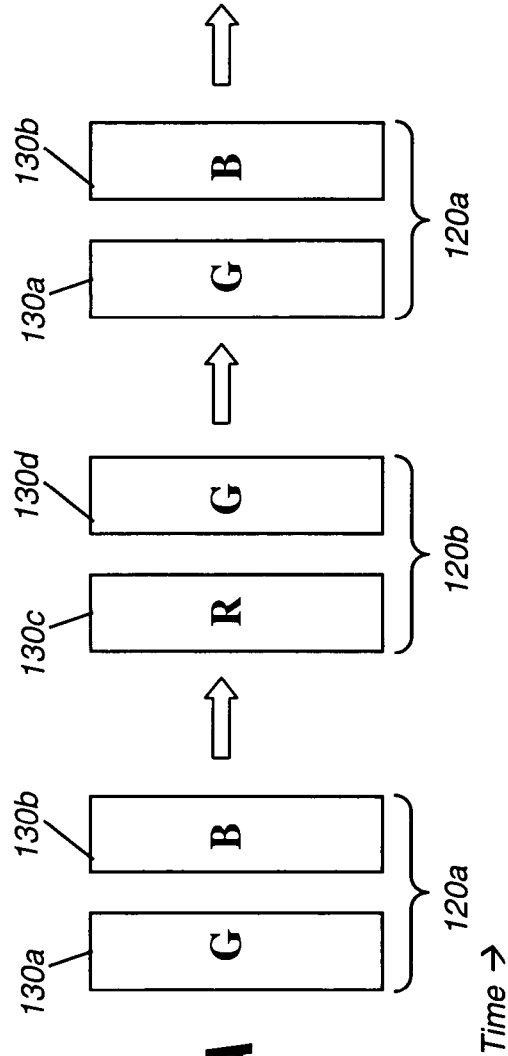
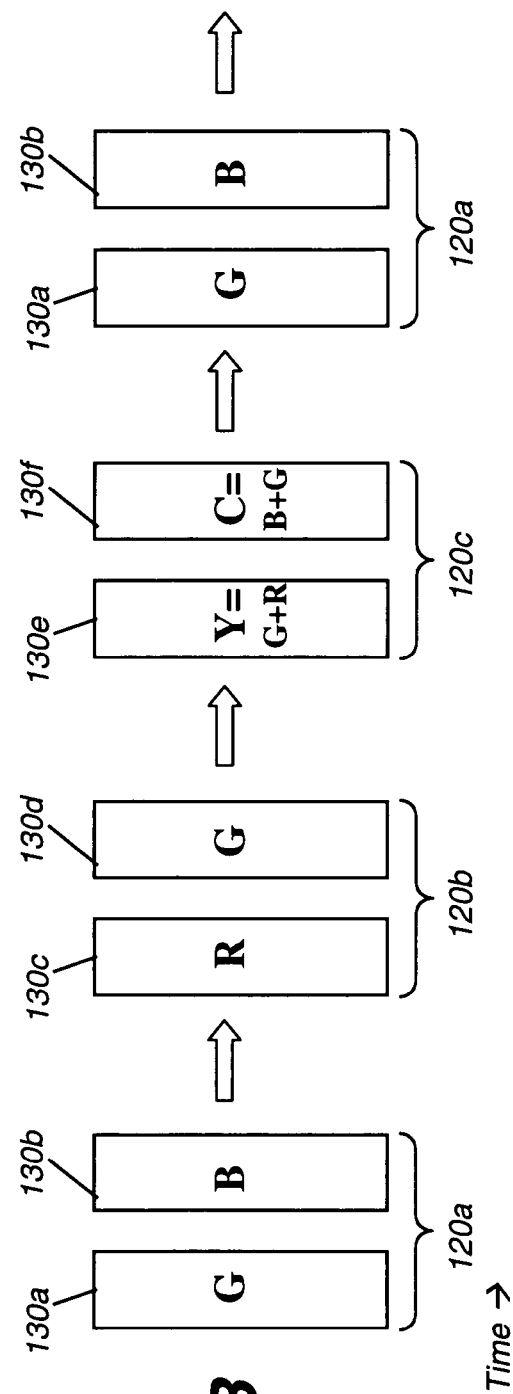
FIG. 9A
FIG. 9B

US 7,411,722 B2

DISPLAY SYSTEM INCORPORATING BILINEAR ELECTROMECHANICAL GRATING DEVICE

CROSS-REFERENCE TO RELATED APPLICATIONS

This is a 111A application of U.S. Provisional Application Ser. No. 60/711,008, filed Aug. 24, 2005.

FIELD OF THE INVENTION

This invention relates to a display system with a linear array of light modulating devices that is scanned in order to generate a two-dimensional image. More particularly, the invention relates to a display system containing a bilinear array of electromechanical grating devices.

BACKGROUND OF THE INVENTION

Spatial light modulators based on electromechanical grating devices are important for a wide range of applications, including display, data storage, spectroscopy and printing. Such systems require large numbers of individually addressable devices in either a linear or area array, with over a million addressable devices desirable for an area modulator array in a high-quality display.

Linear arrays are particularly advantaged over their area array counterparts by virtue of higher resolution, reduced cost, simplified optics, and are particularly well suited for laser light. Grating Light Valve (GLV) linear arrays, as described in U.S. Pat. No. 5,311,360, issued May 10, 1994 to Bloom et al. are one earlier type of linear array that offers a workable solution for high-brightness imaging using laser sources, for example. Another experimental type of linear array just recently disclosed and in early development stages is the flexible micromirror linear array, as described in the article "Flexible micromirror linear array for high resolution projection display" by Francis Picard, et al. in *MOEMS Display and Imaging Systems, Proceedings of SPIE* Vol. 4985 (2003). The prototype flexible micromirror linear array described in the Picard et al. article employs a line of reflective "microbridges" which are individually switched to modulate light to form a linear image.

An electromechanical conformal grating device consisting of ribbon elements suspended above a substrate by a periodic sequence of intermediate supports was disclosed by Kowarz in U.S. Pat. No. 6,307,663, issued on Oct. 23, 2001, entitled "SPATIAL LIGHT MODULATOR WITH CONFORMAL GRATING DEVICE." The electromechanical conformal grating device is operated by electrostatic actuation, which causes the ribbon elements to conform around the support substructure, thereby producing a grating. The device of '663 is known as the conformal GEMS device, with GEMS standing for grating electromechanical system. The conformal GEMS device possesses a number of attractive features. It provides high-speed digital light modulation with high contrast and good efficiency. In addition, in a linear array of conformal GEMS devices, the active region is relatively large and the grating period is oriented perpendicular to the array direction. This orientation of the grating period causes diffracted light beams to separate in close proximity to the linear array and to remain spatially separated throughout most of an optical system and enables a simpler optical system design with smaller optical elements. The large active area provides tolerance to imperfections in the linear illumination beam, for example tolerance to curvature in the line illumination, and to defects in the active area.

Display systems based on a linear array of conformal GEMS devices are described by Kowarz et al. in U.S. Pat. No. 6,411,425, entitled "ELECTROMECHANICAL GRATING DISPLAY SYSTEM WITH SPATIALLY SEPARATED LIGHT BEAMS," issued Jun. 25, 2002, by Kowarz et al. in U.S. Pat. No. 6,476,848, entitled "ELECTROMECHANICAL GRATING DISPLAY SYSTEM WITH SEGMENTED WAVEPLATE," issued Nov. 5, 2002, and by Kowarz et al. in U.S. Pat. No. 6,678,085, "HIGH-CONTRAST DISPLAY SYSTEM WITH SCANNED CONFORMAL GRATING DEVICE," issued Jan. 13, 2004. Display systems based on GLV devices are disclosed in U.S. Pat. No. 5,982,553, entitled "DISPLAY DEVICE INCORPORATING ONE-DIMENSIONAL GRATING LIGHT-VALVE ARRAY" issued to Bloom et al. on Nov. 9, 1999.

Current GEMS and GLV color display system architectures employ three separate color paths, red, green, and blue (RGB), each color path provided with a linear array of electromechanical grating devices. In such a three-chip architecture, each linear array of electromechanical grating devices modulates its component red, green, or blue laser light. The resulting modulated light beams are then combined onto the same output axis to provide a full-color image that is then scanned to the screen. Referring to FIG. 1, there is shown a prior art display system 10, depicted for the case of a GEMS linear array, that uses three separate optical paths in this way.

For red color modulation, a red light source 70r, typically a laser, provides illumination that is conditioned through a spherical lens 72r and a cylindrical lens 74r and directed towards a turning mirror 82r. Light reflected from turning mirror 82r is modulated by diffraction at an electromechanical grating light modulator 85r. Modulated diffracted light from electromechanical grating light modulator 85r is diffracted past turning mirror 82r and to a color combiner 100, such as an X-cube or other dichroic combiner. The modulated light from color combiner 100 is then directed by a lens 75, through an optional cross-order filter 110 (not shown), to a scanning mirror 77 for projection onto a screen 90. Green color modulation uses a similar set of components for providing light to color combiner 100, with a green light source 70g, typically a laser, providing illumination through a spherical lens 72g and a cylindrical lens 74g and directed towards a turning mirror 82g. Light reflected from turning mirror 82g is modulated by diffraction at an electromechanical grating light modulator 85g. Modulated diffracted light from electromechanical grating light modulator 85g is diffracted past turning mirror 82g and to color combiner 100. Similarly, blue light source 70b, typically a laser, provides illumination through a spherical lens 72b and a cylindrical lens 74b and directs light towards a turning mirror 82b. Light reflected from turning mirror 82b is modulated by diffraction at an electromechanical grating light modulator 85b, diffracted past turning mirror 82b and to color combiner 100.

In order to maintain precise color registration with the system of FIG. 1, each of the three linear arrays, electromechanical grating light modulators 85r, 85g, and 85b, must be aligned to each other, to within sub-pixel tolerances.

This precision of alignment is difficult to obtain. Moreover, this alignment must prove stable so that it can be maintained over a range of temperatures and other environmental conditions, such as shock and vibration. Color combiner 100 is a particularly costly component and can be the source of undesirable image aberrations.

One design solution that eliminates the color channel alignment problem, and reduces system complexity and cost, is a color-sequential architecture, whereby a single electromechanical grating light modulator serves to modulate each color light in sequence. This type of system is described, for example, in the disclosure of U.S. Pat. No. 6,411,425 entitled "Electromechanical Grating Display System with Spatially Separated Light Beams" to Kowarz et al. (see cols. 9-10). However, as noted in the '425 Kowarz et al. disclosure, color-sequential techniques, by modulating only one color at a time, effectively waste two-thirds of the potentially available light. Moreover, problems such as excessive flicker can result from the use of color-sequential techniques, particularly under various conditions of color content. Thus, although color-sequential solutions minimize alignment concerns and provide a cost-reduced system, these solutions have performance drawbacks and limitations.

Thus, it can be seen that there would be advantages to a projection solution that provides the performance benefits of electromechanical grating light modulators without requiring frequent adjustment of alignment for each color path or requiring complex and costly mounting apparatus, a solution that would be able to maintain alignment over a wide range of operating conditions and that provides a compact, low-cost apparatus.

SUMMARY OF THE INVENTION

The present invention is directed to overcoming one or more of the problems set forth above by employing a line scanned display system that includes at least three different colors of illumination provided by one or more light sources, and at least one directional illumination optical system for directing the three different colors of illumination. Also in the system is a bilinear array, having two linear arrays of light modulating devices, situated on a common substrate for receiving and modulating two different colors of illumination at any one time that are obtained from the three different colors of illumination. Finally, a lens for creating line images of the two linear arrays on a screen and a scanning mirror for scanning the line images across the screen to form an area image complete the system.

Another aspect of the present invention is a method for displaying a full color image on a screen, by:
  a. forming a first subframe of the full color image by
    i) projecting a first set of two modulated line images onto the screen, wherein the first set of two modulated line images has a first and second line color;
    ii) scanning the first set of two modulated line images across the screen to generate the first subframe;
  b. forming a second subframe of the full color image by
    i) projecting a second set of two modulated line images onto the screen, wherein the second set of two modulated line images has a third and fourth line color; wherein at least three of the four above line colors are different from each other;
    ii) scanning the second set of two modulated line images across the screen to generate the second subframe; and
  c. repeating steps a and b at a predetermined frequency.

ADVANTAGES

It is an advantageous feature of the present invention that the linear arrays of light modulating devices are assembled on a common substrate.

It is an advantage of the present invention that it provides a full-color imaging system, using linear arrays of electromechanical grating devices, where the system does not require alignment of individual color paths for modulated light.

It is an advantage of the present invention that it provides a full-color imaging system using linear arrays of electromechanical grating devices with a reduced number of components, allowing design of a more compact and lower cost apparatus than provided by earlier designs. With its reduced number of components and minimized requirements for adjustment, the apparatus of the present invention provides a robust solution for imaging using electromechanical grating array devices.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIGS. 5A and 5B are other timing sequences for operating an embodiment of the present invention;

FIGS. 9A, 9B and 9C are a set of timing sequences for three-color, five-color and six-color reduced-gamut mode operation, respectively, corresponding to the display apparatus depicted in FIG. 8;

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

For the description that follows, components specific to a single color path may be more particularly identified with an letter appended to the part number. Where used, lower case letters correspond to the optical components for specific colors; for example, "r" is appended for red, "b" for blue, "g" for green, "y" for yellow. Upper case letters identify the colors themselves, for example, "R" is red, "B" is blue, "G" is green, "Y" is yellow, "M" is magenta, "C" is cyan, "O" is orange.

Figure 2A:
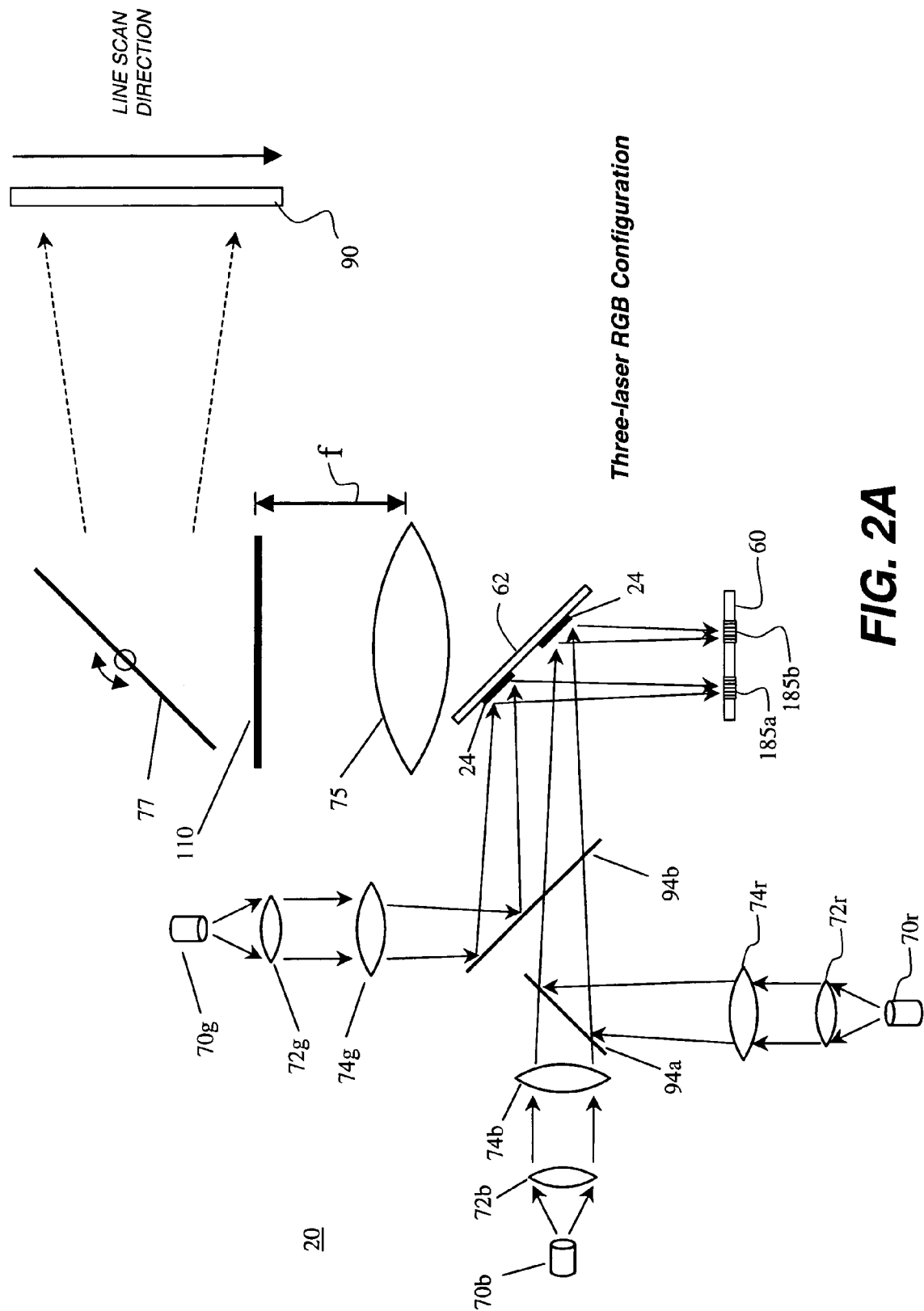
FIG. 2A is a schematic block diagram showing the arrangement of color modulation components in one embodiment of the present invention.
Figure 11B:
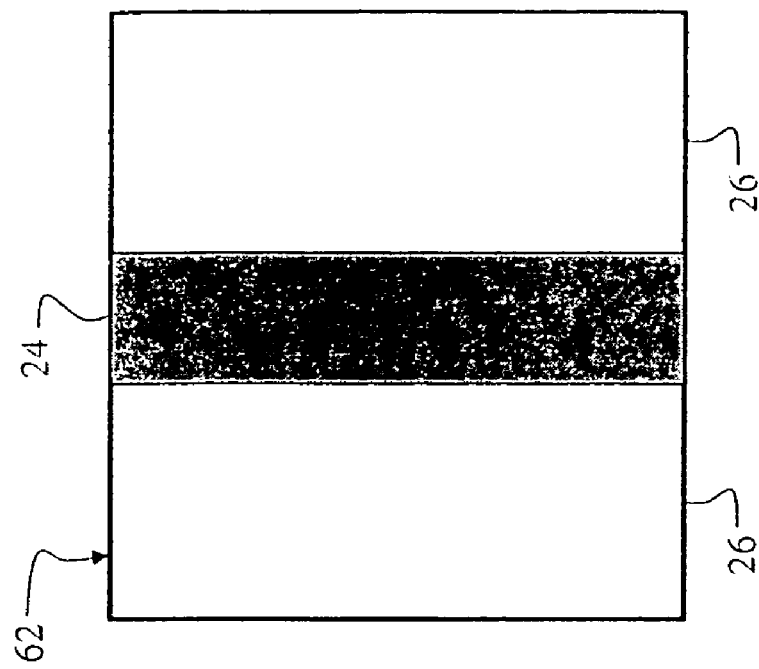
FIGS. 11A and 11B are plan views of patterned micromirror assemblies.
Figure 11A:
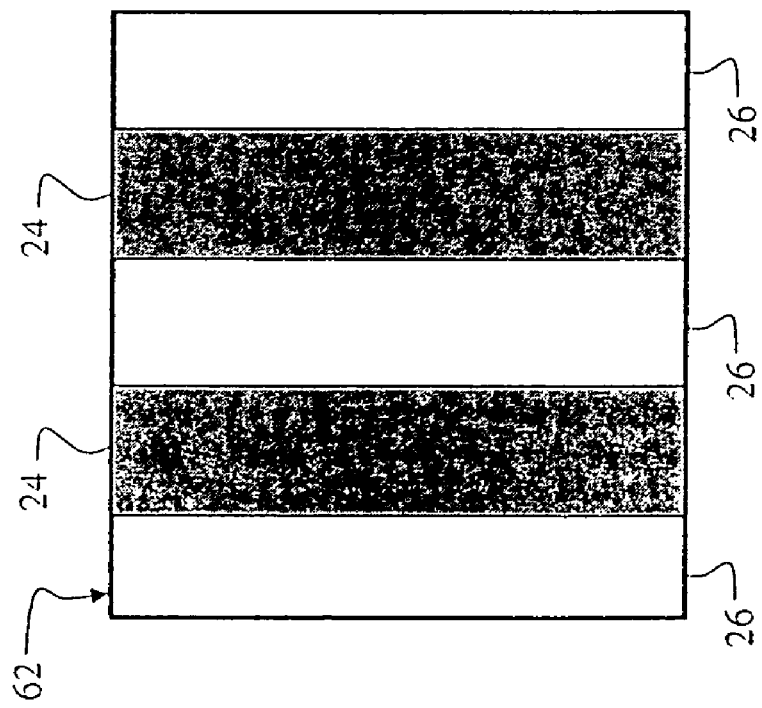

FIG. 2A is a schematic block diagram showing the arrangement of color modulation components in one embodiment of the present invention. This embodiment of display system 20 of the present invention employs a bilinear array of light modulating devices 60 for modulating light from red, green, and blue light sources 70r, 70g, and 70b. In one embodiment, the bilinear array of light modulating devices 60 consists of GEMS devices and the light sources are lasers. A pair of dichroic combiners 94a and 94b is provided in the illumination path, for combining and directing illumination from each of red, green, and blue light sources 70r, 70g, and 70b toward a patterned micromirror assembly 62. The two dichroic combiners 94a and 94b may be combined into a single optical assembly, for example an X-cube. Patterned micromirror assembly 62, in turn, directs the illumination for each color to a corresponding linear array of light modulating devices 185a or 185b in bilinear array of light modulating devices 60. Referring to FIG. 11a, there is shown an arrangement of patterned micromirror assembly 62 for one embodiment. A pair of reflective stripes 24 is provided, with (non-reflective) transparent regions 26 spaced between reflective stripes 24. Reflective stripes 24 may be fabricated using deposition of reflective metallic materials such as aluminum or silver, patterned using shadow mask techniques or other suitable fabrication techniques. Alternatively, the reflective stripes may consist of dielectric thin film mirror regions that are appropriately patterned in stripes. Transparent regions 26 may be fabricated in a number of ways, such as applying an antireflective coating onto a glass substrate, for example. If the two linear arrays of light modulating devices 185a and 185b are situated in close enough proximity, it is possible to use a patterned mirror assembly 62 with a single reflective stripe 24, as shown in FIG. 11b, to direct the illumination onto the bilinear array of light modulating devices 60.

Figure 3:
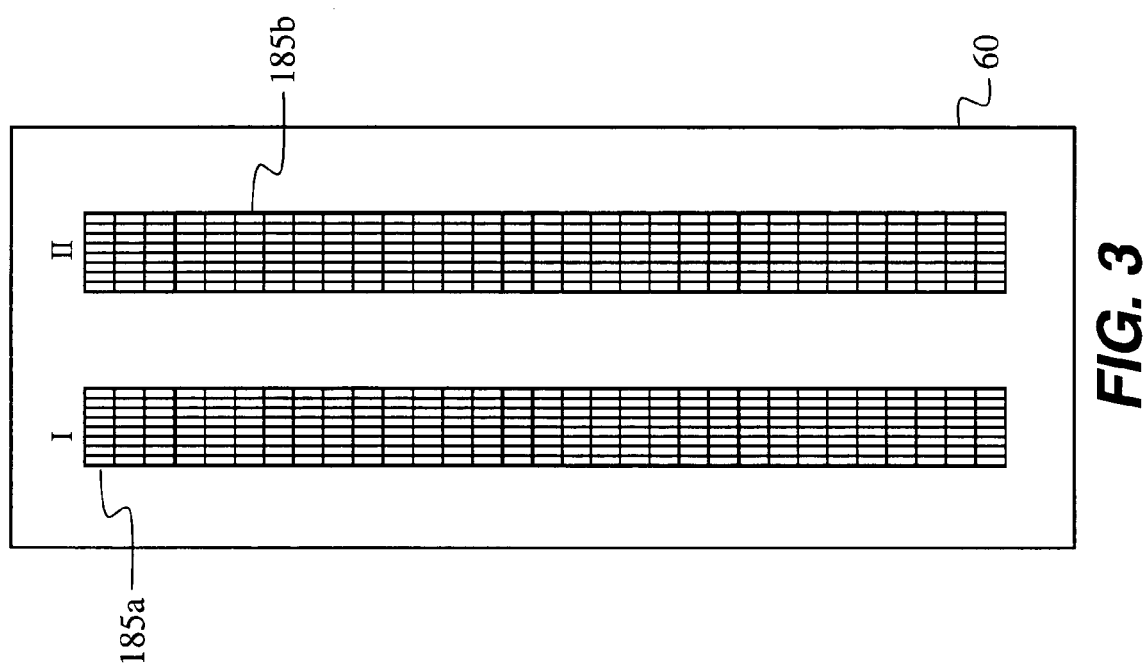
FIG. 3 is a plan view showing a bilinear array of light modulating devices according to one embodiment.

In a preferred embodiment, bilinear array of light modulating devices 60 is formed from two separate electromechanical grating light modulator sections, as shown in FIG. 3. Aligned on the same substrate, each electromechanical grating light modulator section corresponds to a linear array of light modulating devices 185a or 185b. The preferred linear arrays of light modulating devices 185a or 185b consist of GEMS devices. Alternately, any of linear array of light modulating devices 185a or 185b could be a GLV device or a flexible micromirror linear array, as described in the Picard et al. article noted in the background section hereinabove, or any other suitable light modulation device.

Figure 1:
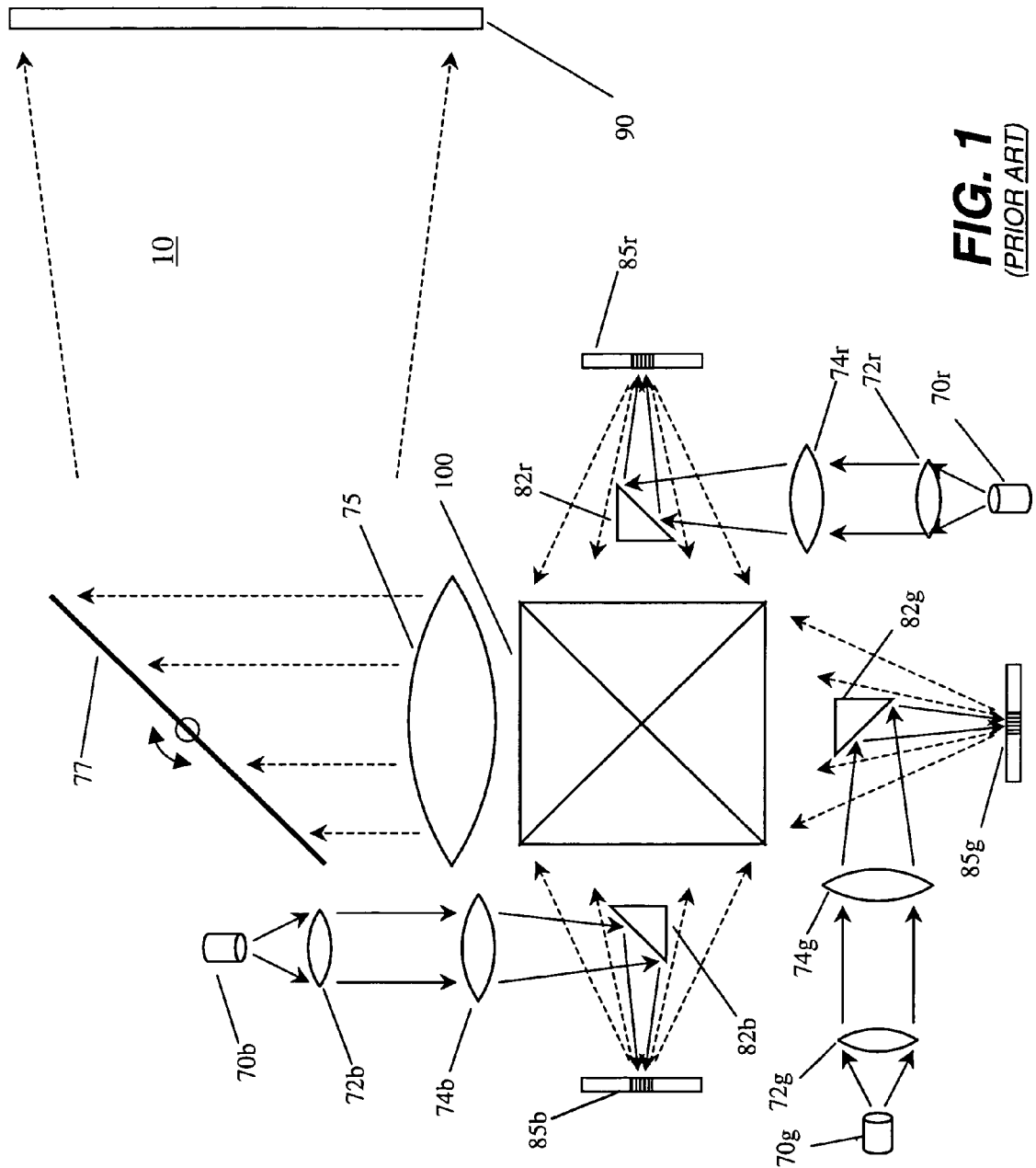
FIG. 1 is a schematic block diagram showing a prior art display apparatus employing an electromechanical grating light modulator in each of three color modulation channels.

Referring again to FIG. 2A, reflective stripes 24 of patterned micromirror assembly 62 are angularly aligned with each linear array of light modulating devices 185a and 185b in display system 20. Modulated light passes through the transparent regions 26 of patterned micromirror assembly 62 and is then directed through lens 75 and optional cross-order filter 110, placed at focal distance f from lens 75, to scanning mirror 77 for forming the final color image on screen 90, as was described with reference to the prior art apparatus of FIG. 1. For linear arrays of light modulating devices 185a or 185b that modulate light by diffraction, such as GEMS or GLV devices, the modulated light consists of one or more diffracted orders.

Various types of path combining components could be used in the illumination path; typically, these components employ an arrangement of dichroic surfaces. The lenses 72r, 72g, 72b, 74r, 74g and 74b, dichroics 94a and 94b, and patterned mirror assembly 62 form a directional illumination optical system for shaping and directing the illumination onto the bilinear array of light modulating devices 60. While some amount of alignment is needed for red, green, and blue light sources 70r, 70g, and 70b, the arrangement of FIG. 2A allows some tolerance for imperfect alignment.

Figure 2B:
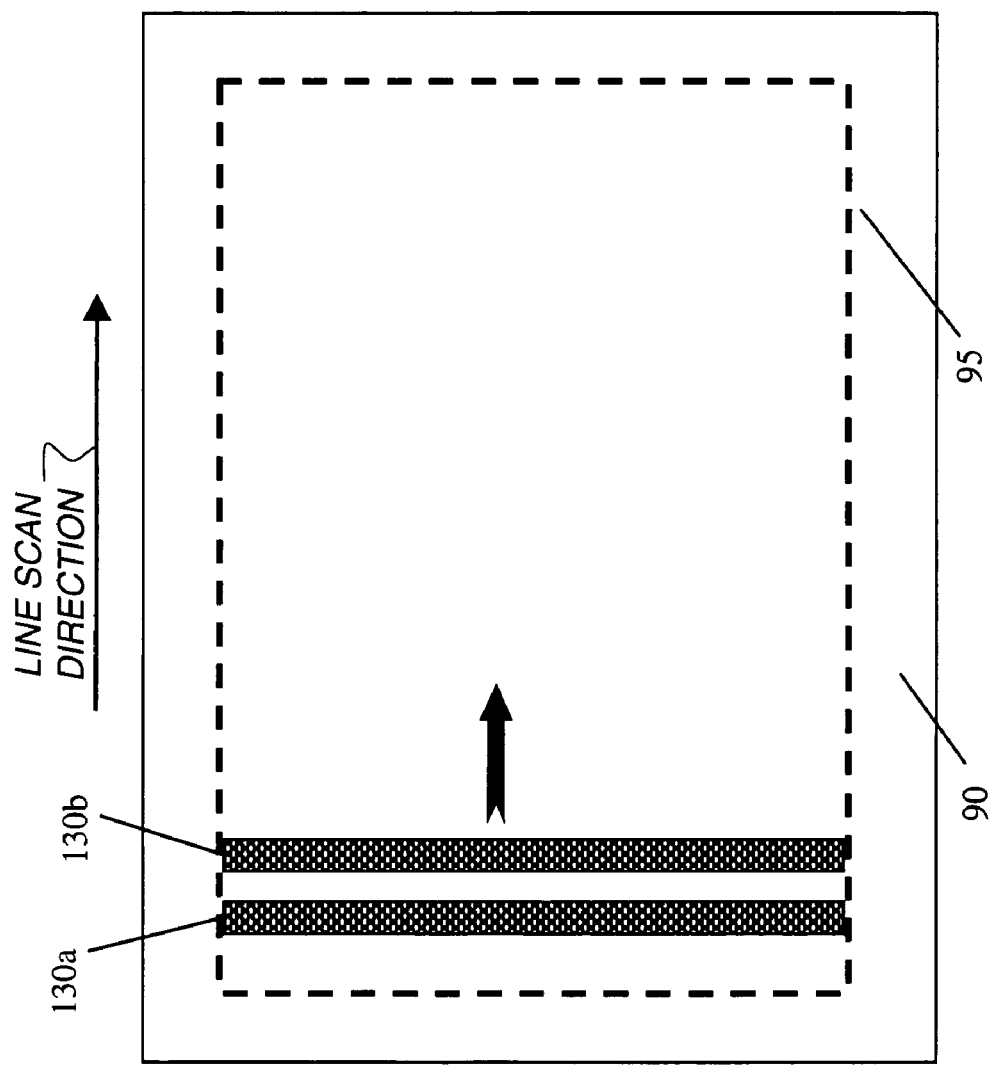
FIG. 2B is a view facing the screen of the display system of the present invention.

FIG. 2B is a view facing the screen 90 of display system 20, showing the two modulated line images 130a and 130b that correspond to the two linear arrays of light modulating devices 185a and 185b. The line scan of the two modulated line images 130a and 130b across the screen caused by the rotation of the scanning mirror 77 provides an area image 95 for viewing. It is instructive to observe that the two modulated line images 130a and 130b are spatially separated on the screen 90 at any one instant of time. This necessitates incorporating a time delay into display logic to compensate for this spatial separation, so that lines of the output image are written at the appropriate time, as paced by scanning hardware. At any one moment, for example, linear array of light modulating devices 185a is writing a line (n) of the output image; linear array of light modulating devices 185b is writing an adjacent or nearby line (n+m) of the output image.

Referring now to FIG. 3, there is shown a plan view representation of the bilinear array of light modulating devices 60 in a simple embodiment. In operation, each device on the linear array of light modulating devices 185a or 185b operates independently, having its own control signals, routed from driver circuitry (not shown in FIG. 3). The driver circuitry may consist of separate driver chips that are connected to the bilinear array of light modulating devices 60 by wire-bonding or flip-chip technology, as in a multi-chip module. Alternatively, the driver circuitry can be integrated into the same substrate as that of the bilinear array of light modulating devices 60. When used in the embodiment of FIG. 2A, linear array 185a would receive green illumination and linear array 185b would receive blue and/or red illumination.

It must be noted that the relative resolution of different colors of modulated light need not be the same. As is well known in the imaging arts, it is most important for green modulated light to have high resolution. Lower resolution of the other colors, particularly of blue and to some extent of red, is acceptable and has little impact on image quality. For example, for full HDTV resolution, one linear array of light modulating devices, designed for green illumination, could have 1080 individually operable devices and the other, designed for modulation of blue and red illumination, could have 540 individually operable devices.

Figure 4A:
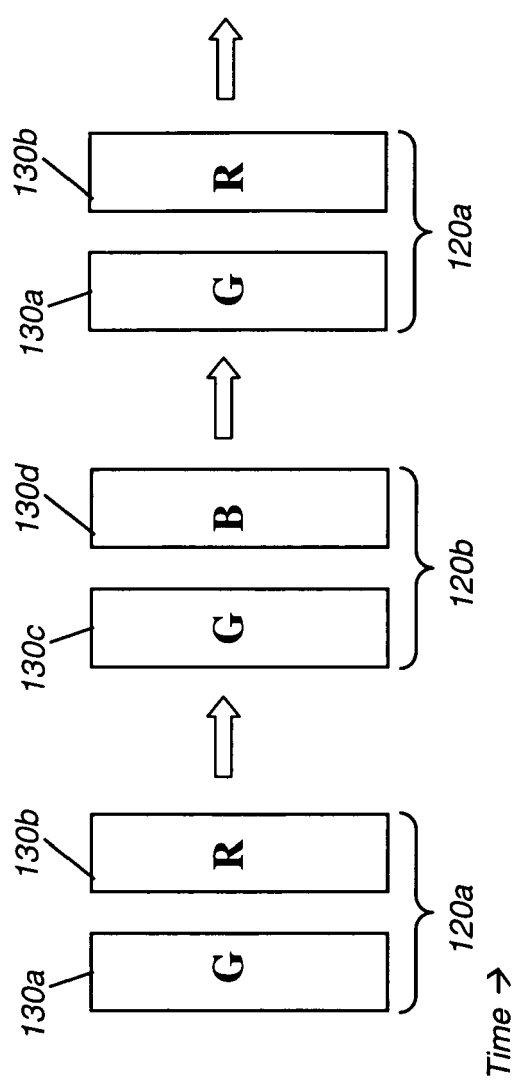
FIGS. 4A and 4B are timing sequences for two different modes of operating the display apparatus depicted in FIG. 2A.
Figure 4B:
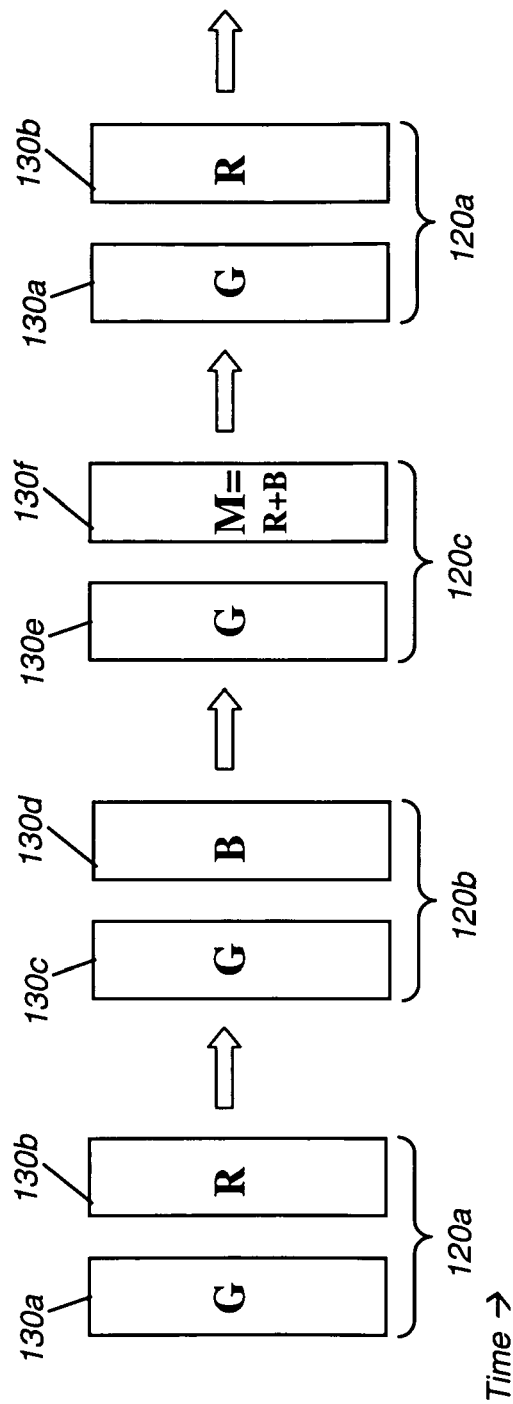

FIGS. 4A and 4B are a set of timing sequences that correspond to two different methods of operating the embodiment of display system 20 depicted in FIG. 2A, with one linear array of light modulating devices always illuminated by green light. FIG. 4A illustrates one possible timing sequence using three-color mode. In this sequence, a full color image is displayed on the display screen 90 or surface using two subframes 120a and 120b. To form each subframe 120a and 1120b, two modulated line images are projected onto and scanned across the screen 90. The first subframe 120a is produced using a modulated line image 130a with a green line color, obtained with green light source 70g turned on, and a modulated line image 130b with a blue line color, obtained with blue light source 70b turned on and red light source 70r turned off. The second subframe 120b is then formed using again a green modulated line image 130c and a red modulated line image 130d, obtained with blue light source 70b turned off and red light source 70r turned on. This subframe sequence is then repeated at a high enough frequency to avoid flicker. Because the green channel has the most pronounced effect on luminance for the display, the arrangement of FIG.

5A is advantaged for its low flicker level. The same hardware architecture (see FIG. 2A) can be run in a four color mode, as shown in FIG. 4B. A third subframe 120c is then added to the sequence, which contains a green modulated line image 130e and a magenta modulated line image 130f, obtained with both blue and red light sources 70b and 70r turned on. This mode can be used to produce a higher brightness image if both the blue and red light sources are underpowered with respect to the green. If only red or only blue is underpowered, subframe 120c could be formed with a green modulated line image and a line image corresponding to the underpowered light source.

Figure 5A:
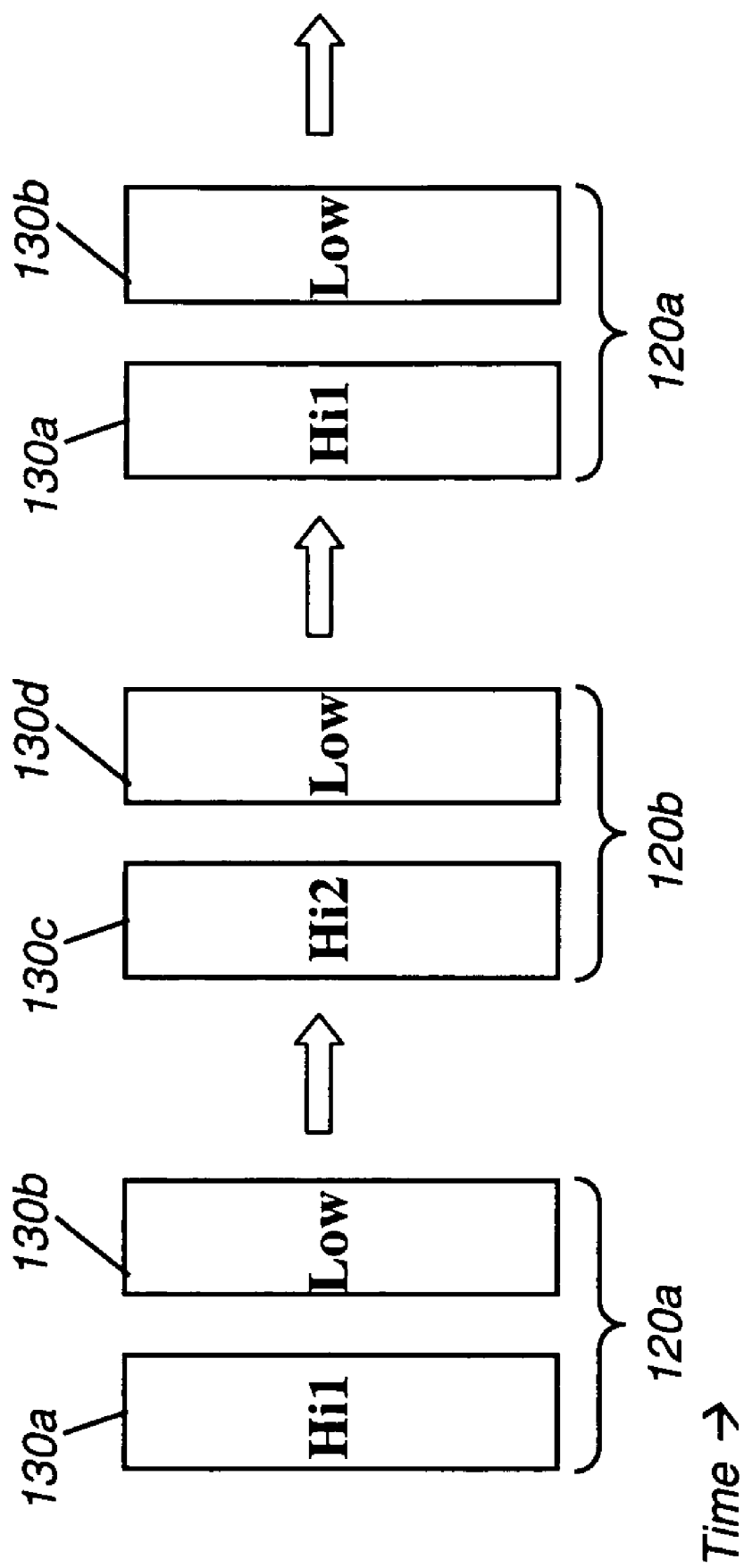

Alternatively, it will be readily apparent to those skilled in the art that it is possible to modify the architecture of the display system 20 of FIG. 2A so that the color that is relatively underpowered can be repeated in every subframe. The timing sequence for this approach is illustrated in FIG. 5A. Subframes 120a and 120b both contain modulated line images 130b and 130d formed using colored illumination from the underpowered light source and indicated by the label Low. Whereas the two other colors, labeled Hi1 and Hi2, are alternated between subframes. The same hardware architecture can also be run in a four-color mode, as illustrated in FIG. 5B for the specific case where the underpowered color is blue. The display system 20 is then configured to provide both green and red illumination onto one linear array of light modulating devices and blue illumination onto the other linear array. A yellow modulated line image 130e can then be formed, in addition to red, green and blue modulated line images, by simultaneously turning on green and red light sources.

Alternate Embodiments for Display System 20

Figure 6:
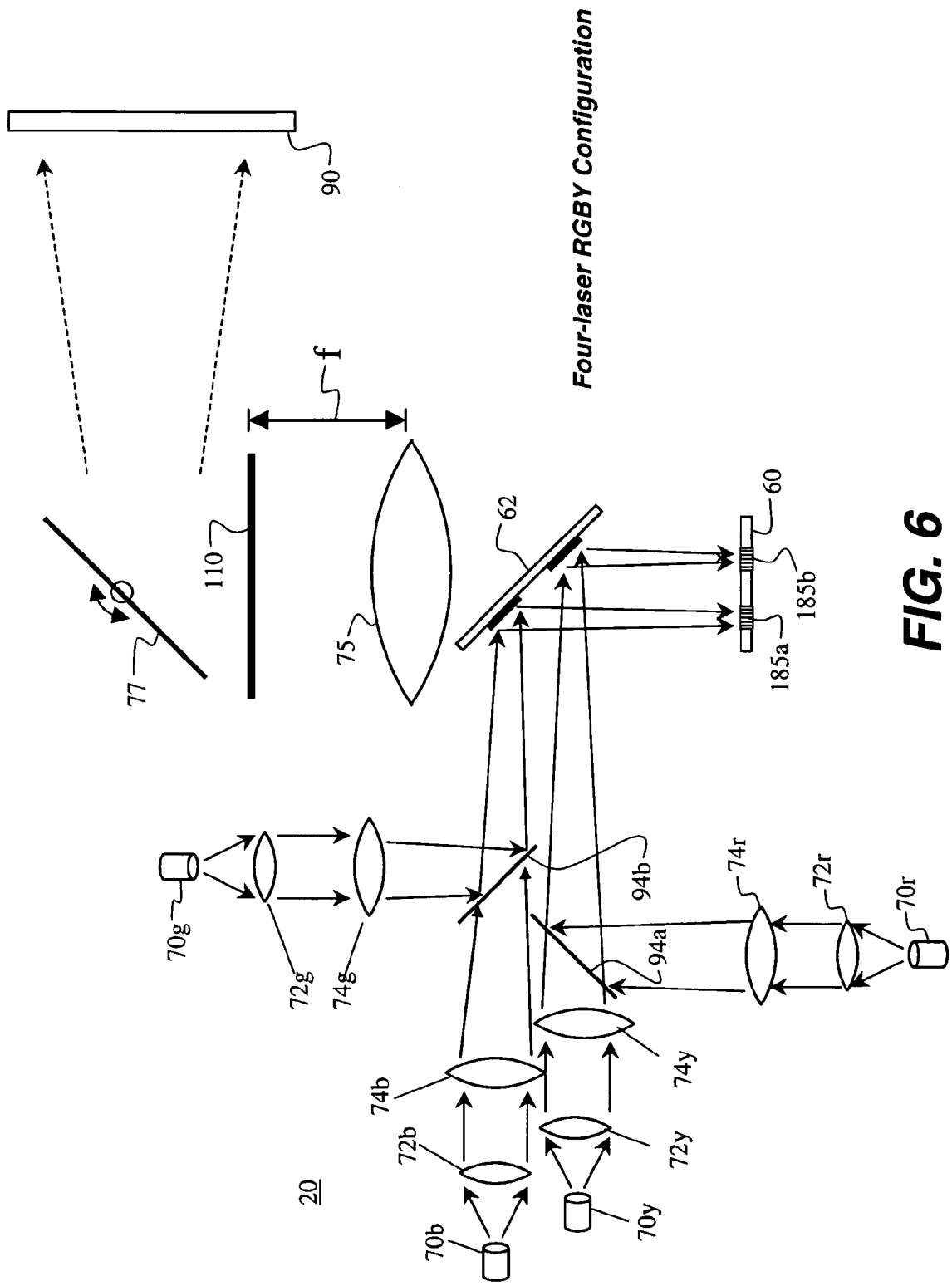
FIG. 6 is a schematic block diagram showing an alternate embodiment of the display apparatus of the present invention that has four lasers in an RGBY configuration.

Referring to FIG. 6, there is shown an alternate embodiment for display system 20 using a four-light source RGBY configuration. In this embodiment, the bilinear array of light modulating devices 60 modulates light from red, green, blue and yellow light sources 70r, 70g, 70b and 70y, which are preferably lasers. A dichroic combiner 94a combines and directs illumination from red and yellow light sources towards one linear array of light modulating devices 185a by employing a yellow spherical lens 72y and a yellow cylindrical lens 74y for shaping and directing the illumination. A second dichroic combiner 94b is used to provide green and blue illumination to the second linear array of light modulating devices 185b.

Figure 7A:
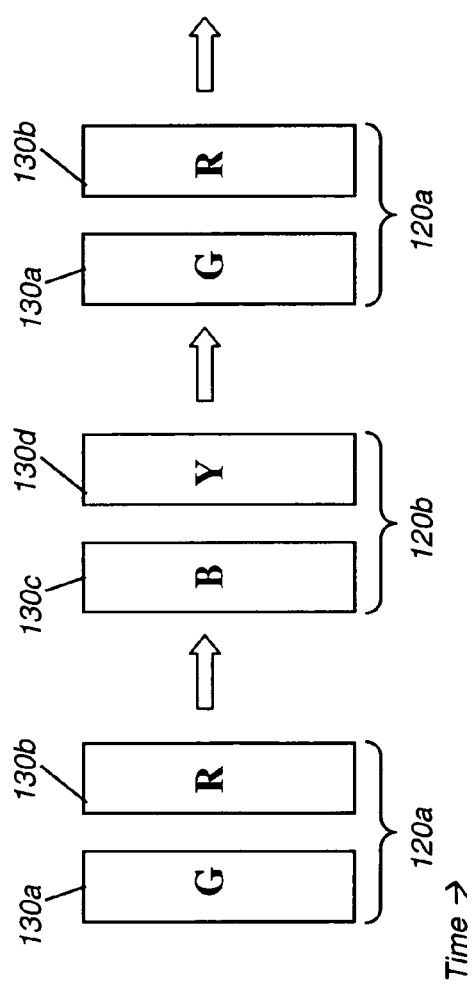
FIGS. 7A and 7B are a set of timing sequences for four-color and six-color mode operation, respectively, corresponding to the display apparatus depicted in FIG. 6.
Figure 7B:
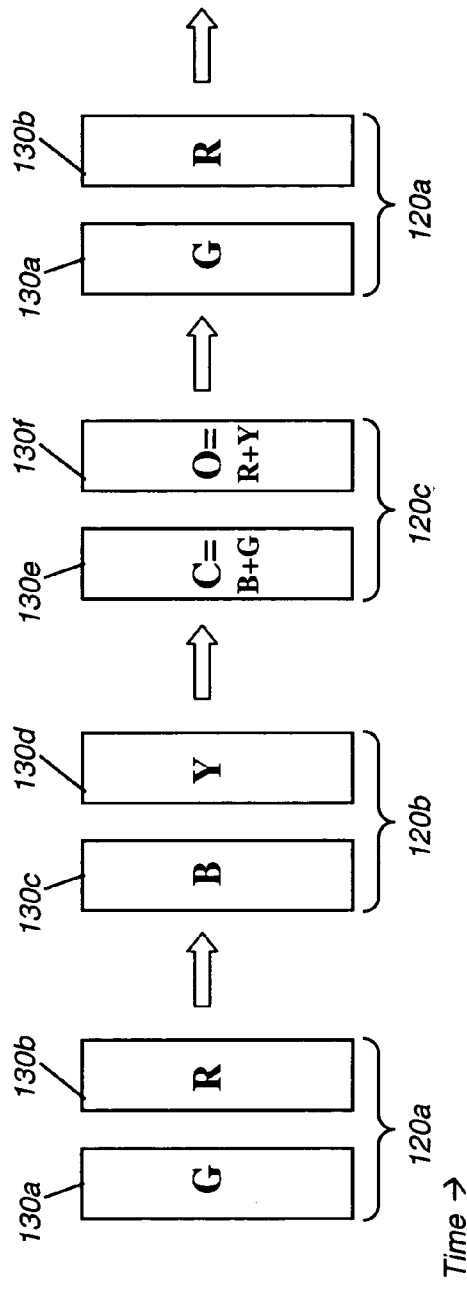

The embodiment of FIG. 6 enables many different modes of operation. FIGS. 7A and 7B illustrate timing sequences that correspond to two of these modes: a four-color mode and a six-color mode. In the four-color mode of FIG. 7A, a full color image is formed on the display screen 90 using two subframes 120a and 120b. The first subframe 120a is produced using a green modulated line image 130a, obtained with green light source 70g turned on and blue light source 70b turned off, and a red modulated line image 130b, obtained with red light source 70r turned on and yellow light source 70y turned off. The second subframe 120b is then formed using a blue modulated line image 130c, obtained with green light source 70g turned off and blue light source 70b turned on, and a yellow modulated line image 130d, obtained with red light source 70r turned off and yellow light source 70y turned on. This subframe sequence is then repeated. Because each of the subframes contains green or yellow, the luminance levels can be relatively constant so that this mode of operation provides relatively low flicker. The architecture of FIG. 6 can also be run in the six-color mode depicted in FIG. 7B. A third subframe 120c is added that contains a cyan modulated line image 130e, formed with both blue and green light sources 70b and 70g turned on, and a orange modulated line image 130f, formed with both red and yellow light sources 70r and 70y turned on. The six-color mode can provide higher brightness than the four-color mode, but with potentially higher flicker.

Figure 8:
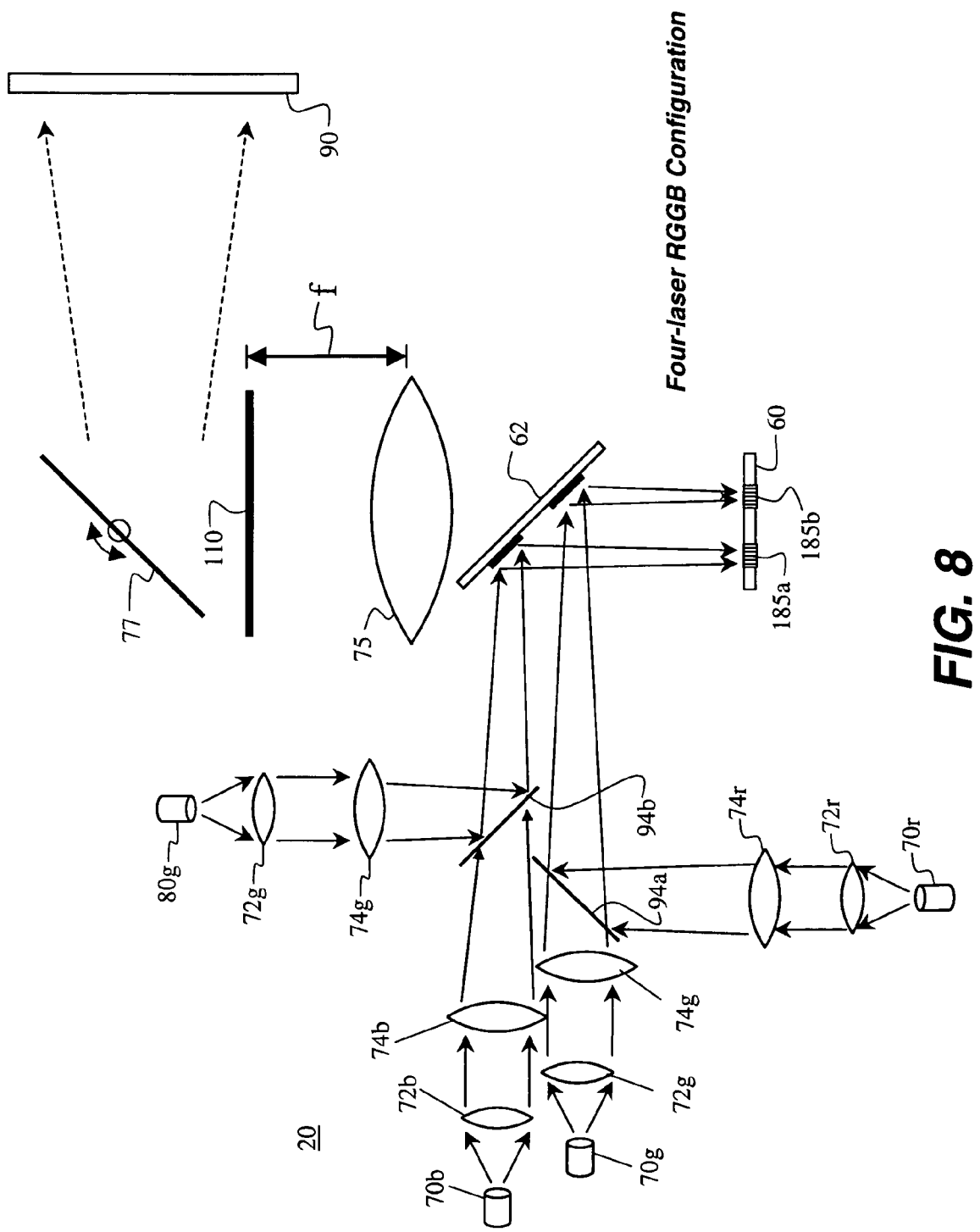
FIG. 8 is a schematic block diagram showing an alternate embodiment of the display apparatus of the present invention that has four lasers in an RGGB configuration.

The four light source approach can also be used to compensate for the situation where one of the red, green or blue light sources is relatively underpowered compared to the other two. Two of the weaker sources can then be used, as illustrated in the embodiment of FIG. 8, which has two green light sources 70g and 80g used in an RGGB configuration for the display system 20. One dichroic combiner 94a combines light from green light source 70g and red light source 70r, for illumination of linear array of light modulating devices 185a, and a second dichroic combiner 94b combines light from green light source 80g and blue light source 70b, for linear array of light modulating devices 185b.

Figure 9C:
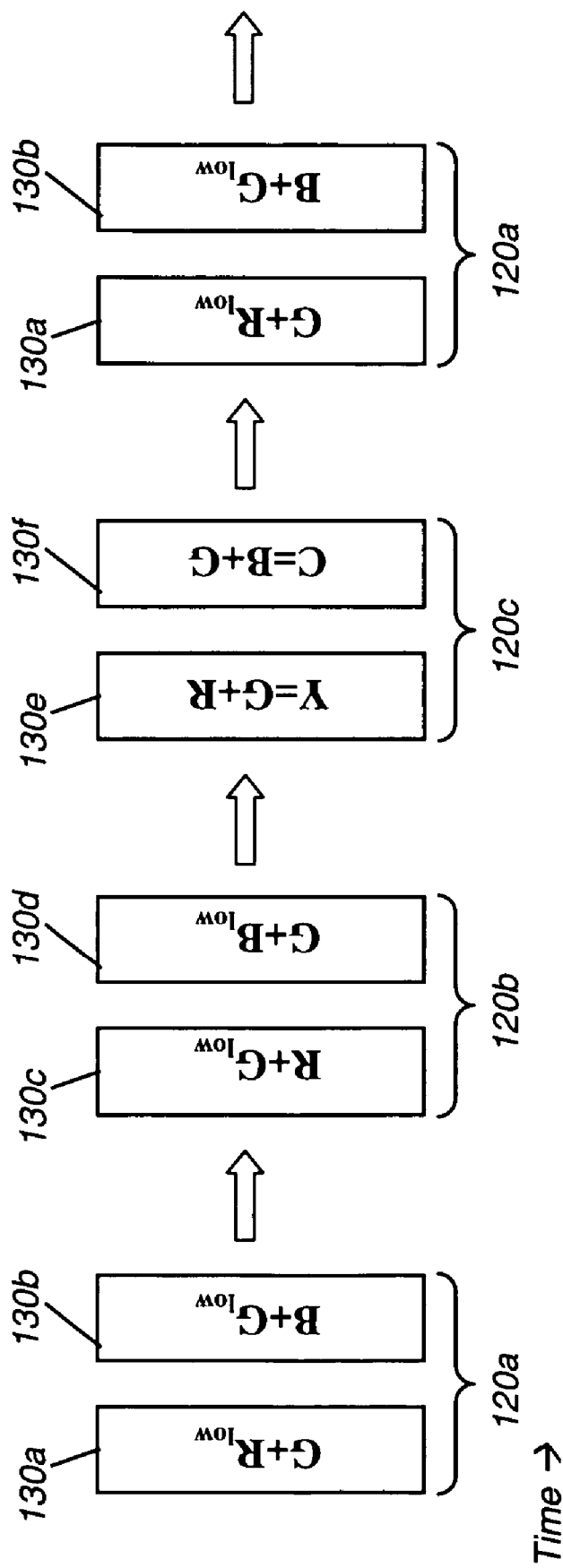

FIGS. 9A, 9B and 9C show 3 different possible modes for operating the embodiment of FIG. 8: a three-color mode, a five-color mode, and a six-color reduced-gamut mode. Many other modes are possible, as will be apparent to those skilled in the art. In the three-color mode (FIG. 9A), which contains two subframes 120a and 120b with modulated line images 130a, 130b, 130c and 130d, each modulated light image is formed using illumination from only a single light source. The five-color mode depicted in FIG. 9B adds a third subframe 120c to the sequence, with a yellow modulated line image 130e, obtained by mixing light from green light source 70g and red light source 70r, and a cyan modulated line image 130f, obtained by mixing light from green light source 80g and blue light source 70b. This mode can provide some increase in the brightness of the display. To further increase brightness, at the expense of color gamut, the output levels of the various light sources can be controlled and mixed in different subframes. For example, FIG. 9C shows a six-color reduced-gamut mode, with three subframes 120a, 120b and 120c, in which each modulated line image (130a, 130b, 130c, 130d, 130e and 130f) is formed by mixing illumination from two light sources, at different output levels. The following table summarizes the colors of the modulated line images for this particular mode.

| Modulated Line Image | Line Color | Light Source Output Level |
|---|---|---|
| 130a | Yellowish green ($G + R_{low}$) | 70g at high 70r at low |
| 130b | Greenish blue ($B + G_{low}$) | 70b at high 80g at low |
| 130c | Orangish red ($R + G_{low}$) | 70g at low 70r at high |
| 130d | Bluish green ($G + B_{low}$) | 70b at low 80g at high |
| 130e | Yellow ($G + R$) | 70g at high 70r at high |
| 130f | Cyan ($B + G$) | 70b at high 80g at high |

Figure 10A:
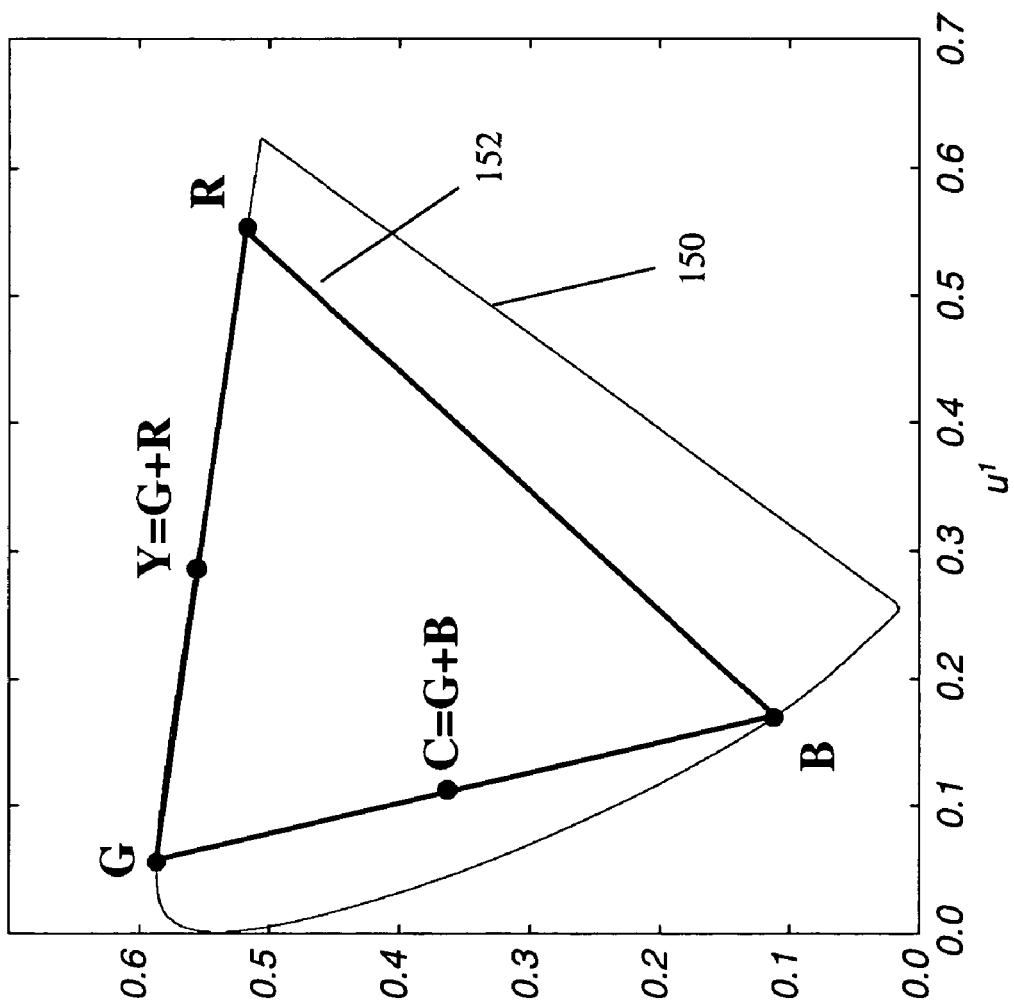
FIGS. 10A and 10B show color gamut curves corresponding to the timing sequences shown in FIGS. 9A, 9B and 9C.
Figure 10B:
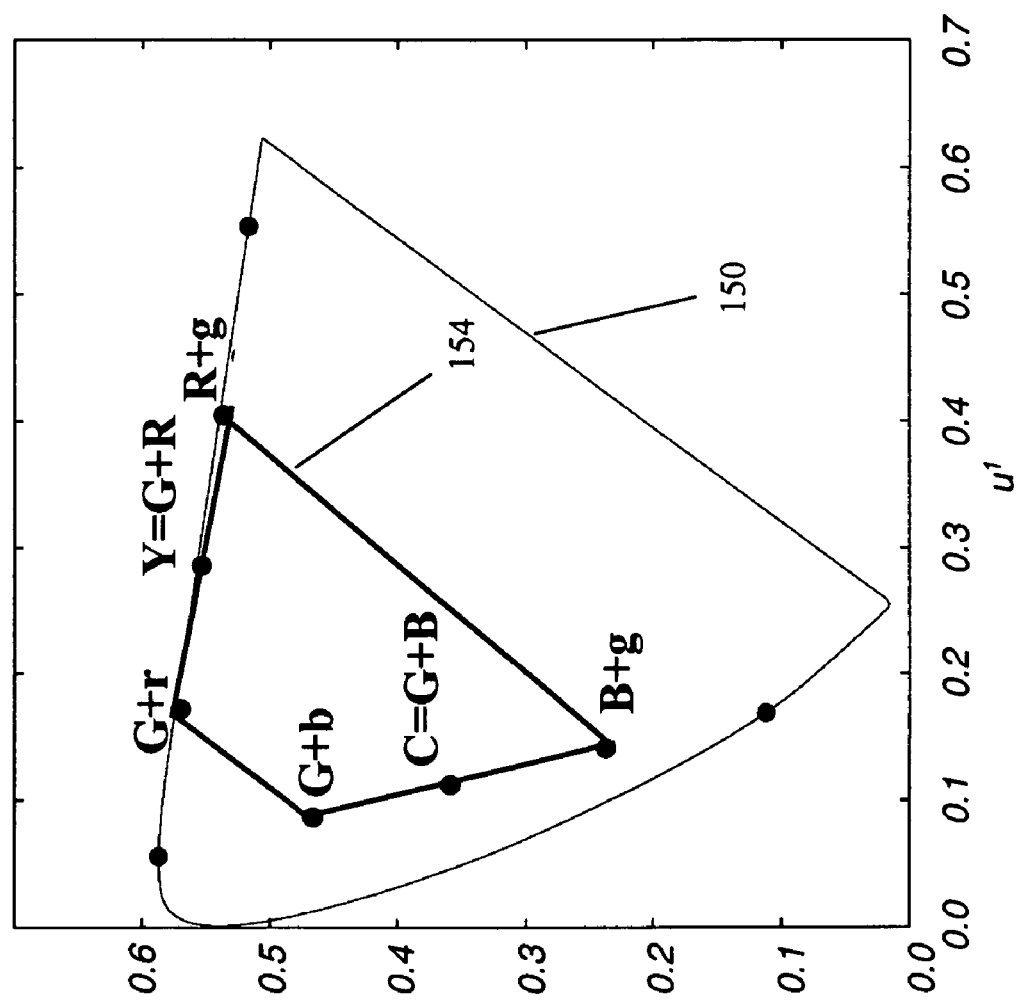

FIGS. 10A and 10B show CIE (Commission International de l'Eclairage) u',v' diagrams of the color gamut can be obtained using the modes corresponding to FIGS. 9A, 9B and 9C, for laser light sources. The visible gamut curve 150 forms the boundary of all colors that can be perceived by the human visual system. Curve 152 shows the color gamut that can be obtained using the three-color mode of FIG. 9A and the five-color mode of FIG. 9B. Curve 154 shows the reduced color gamut that corresponds to the six-color mode of FIG. 9C.

The invention has been described with reference to a preferred embodiment; however, it will be appreciated that variations and modifications can be effected by a person of ordinary skill in the art without departing from the scope of the invention. Thus, what is provided is a display apparatus and method using a bilinear array of light modulating devices to provide high-quality imaging at lower cost.

PARTS LIST

- 10 Display system
- 20 Display system
- 24 Reflective stripe
- 26 Transparent region
- 60 Bilinear array of light modulating devices
- 62 Patterned micromirror assembly
- 70$r$ Red light source
- 70$g$ Green light source
- 70$b$ Blue light source
- 70$y$ Yellow light source
- 72$r$ Red spherical lens
- 72$g$ Green spherical lens
- 72$b$ Blue spherical lens
- 72$y$ Yellow spherical lens
- 74$r$ Red cylindrical lens
- 74$g$ Green cylindrical lens
- 74$b$ Blue cylindrical lens
- 74$y$ Yellow cylindrical lens
- 75 Lens
- 77 Scanning mirror
- 80$g$ Green light source
- 82$r$ Red turning mirror
- 82$g$ Green turning mirror
- 82$b$ Blue turning mirror
- 85$r$ Red electromechanical grating light modulator
- 85$g$ Green electromechanical grating light modulator
- 85$b$ Blue electromechanical grating light modulator
- 90 Display screen
- 94$a$ Dichroic combiner
- 94$b$ Dichroic combiner
- 95 Area image
- 100 Color combiner
- 110 Cross-order filter
- 120$a$ Subframe
- 120$b$ Subframe
- 120$c$ Subframe
- 130$a$ Modulated line image
- 130$b$ Modulated line image
- 130$c$ Modulated line image
- 130$d$ Modulated line image
- 130$e$ Modulated line image
- 130$f$ Modulated line image
- 150 Visible gamut curve
- 152 Color gamut curve
- 154 Color gamut curve
- 185$a$ Linear array of light modulating devices
- 185$b$ Linear array of light modulating devices

What is claimed is:

1. A line scanned display system, comprising:
   a) at least three different colors of illumination provided by one or more light sources;
   b) at least one directional illumination optical system for directing the at least three different colors of illumination;
   c) a bilinear array having two linear arrays of light modulating devices situated on a common substrate for receiving and modulating two different colors of illumination at any one time that are obtained from the at least three different colors of illumination;
   d) a lens for creating line images of the two linear arrays on a screen; and
   e) a scanning mirror for scanning the line images across the screen to form an area image.

2. The display system claimed in claim 1, wherein the directional illumination optical system includes a patterned mirror assembly having reflective and transparent regions.

3. The display system claimed in claim 2, wherein the patterned mirror assembly includes a single continuous reflective region.

4. The display system claimed in claim 2, wherein the patterned mirror assembly includes two separated reflective regions.

5. The display system claimed in claim 1, wherein the two linear arrays of light modulating devices are either conformal grating electromechanical devices, grating light valves, or flexible micromirror linear arrays.

6. The display system claimed in claim 1, wherein the at least three different colors of illumination include red, green, and blue.

7. The display system claimed in claim 6, wherein the at least three different colors of illumination further include cyan, yellow, or magenta.

8. The display system claimed in claim 1, wherein the at least one directional illumination optical system includes a dichroic combiner.

9. The display system claimed in claim 1, wherein the directional illumination optical system combines two of the at least three different colors of illumination and directs the two colors of illumination along a common illumination path and onto one linear array of light modulating devices.

10. The display system claimed in claim 1, wherein at least one of the colors is formed by a mixture of light from two sources.

11. The display system claimed in claim 1, wherein the light sources are lasers.

12. A method for displaying a full color image on a screen, comprising the steps of:
   a. forming a first subframe of the full color image by
      i) projecting a first set of two modulated line images onto the screen, wherein the first set of two modulated line images has a first and second line color;
      ii) scanning the first set of two modulated line images across the screen to generate the first subframe;
   b. forming a second subframe of the full color image by
      i) projecting a second set of two modulated line images onto the screen, wherein the second set of two modulated line images has a third and fourth line color; wherein at least three of the four above line colors are different from each other;
      ii) scanning the second set of two modulated line images across the screen to generate the second subframe; and
   c. repeating steps a and b at a predetermined frequency.

13. The method claimed in claim 12, wherein the two modulated line images within a set are spatially separated on the screen at any one moment in time.

14. The method claimed in claim 13, further comprising the step of synchronizing an image data stream according to a distance between the two spatially separated modulated line images.

15. The method claimed in claim 12, wherein at least one line color of the four line colors is formed from a mixture of two colors.

16. The method claimed in claim 15, wherein the full color image has a reduced color gamut as a result of the two mixed colors.

17. The method claimed in claim 15, wherein the mixture is yellow, cyan or magenta.

18. The method claimed in claim 12, wherein a third subframe is formed having a third set of two modulated line images with at least one new line color with respect to the first and second subframes.

19. The method claimed in claim 12, wherein one of the colors in the first subframe is the same as one of the line colors in the second subframe.

20. The method claimed in claim 12, wherein the four line colors include red, green, and blue.

* * * * *